United States Patent [19]
Dojo

[11] Patent Number: 5,444,195
[45] Date of Patent: Aug. 22, 1995

[54] SOUND INSULATING DEVICE

[76] Inventor: Yosiharu Dojo, 50-16, Miyama 5-chome, Funabashi-shi, Chiba, Japan

[21] Appl. No.: 152,124

[22] Filed: Nov. 16, 1993

[30] Foreign Application Priority Data

Nov. 24, 1992 [JP] Japan .................. 4-334898

[51] Int. Cl.$^6$ ............................................. F16F 15/00
[52] U.S. Cl. .................... 181/208; 52/167.4; 248/638
[58] Field of Search ............ 181/207, 208, 209; 248/638; 52/167 EA

[56] References Cited

U.S. PATENT DOCUMENTS

| | | | |
|---|---|---|---|
| 4,371,143 | 2/1983 | Ishida et al. | 248/638 |
| 4,496,130 | 1/1985 | Toyama | 248/585 |
| 4,517,778 | 5/1985 | Nicolai | 52/167 EA |
| 4,565,039 | 1/1986 | Oguro et al. | 52/167 EA |

FOREIGN PATENT DOCUMENTS 2-289759 11/1990 Japan .

*Primary Examiner*—Khanh Dang
*Attorney, Agent, or Firm*—Longacre & White

[57] ABSTRACT

A sound insulating device having a shock absorbing mechanism put between an upper material and a lower material, for absorbing vibrational impact sounds wherein the shock absorbing mechanism comprises a spring mechanism that elastically deforms under the effect of an impact load thereby absorbing vibrational impact sounds, and a shock absorber disposed between the spring mechanism and the upper material or the lower material, the shock absorber having a weakened portion that deforms elastically prior to the elastic deformation of the spring mechanism. Vibrational light weight impact sounds as well as vibrational heavy weight impact sounds can be absorbed by absorbing the vibrational light weight impact sounds by the elastic deformation of the weakened portion, without deteriorating the habitability.

9 Claims, 15 Drawing Sheets

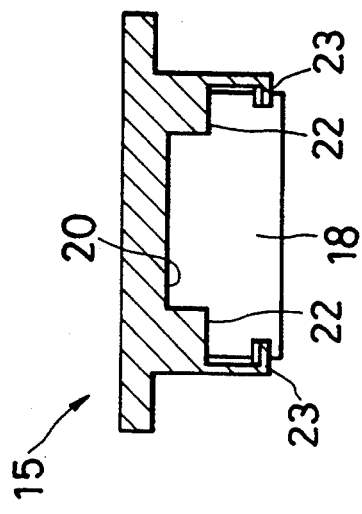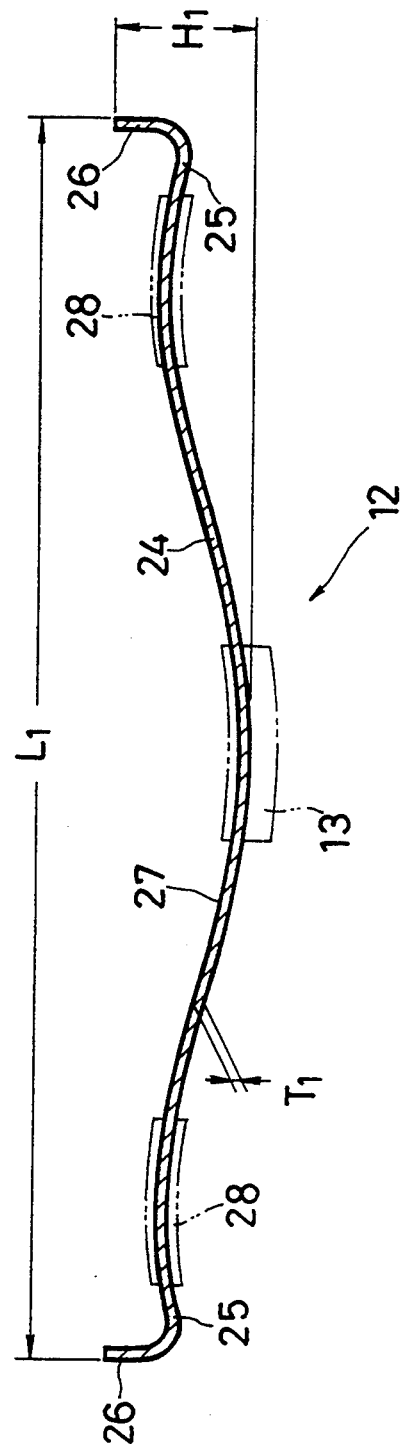

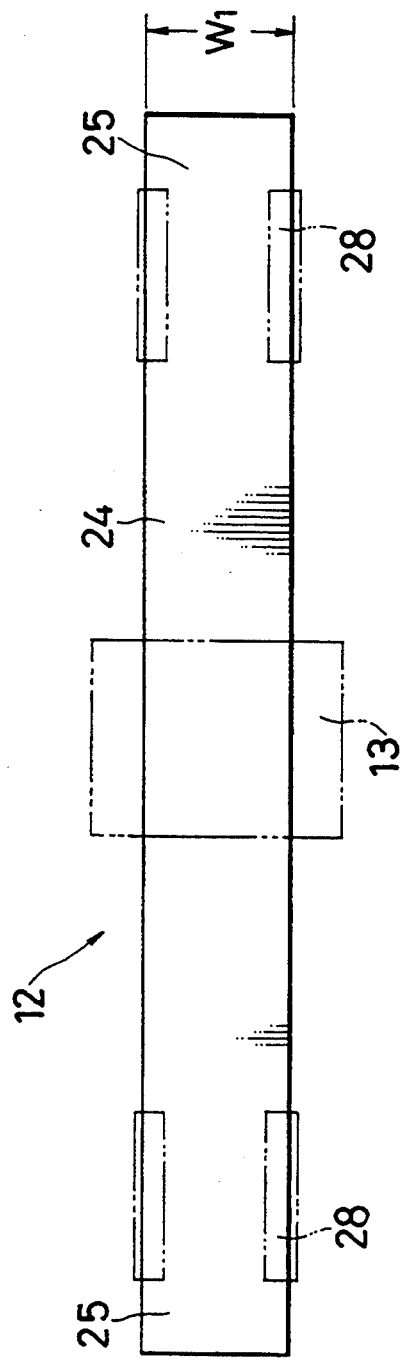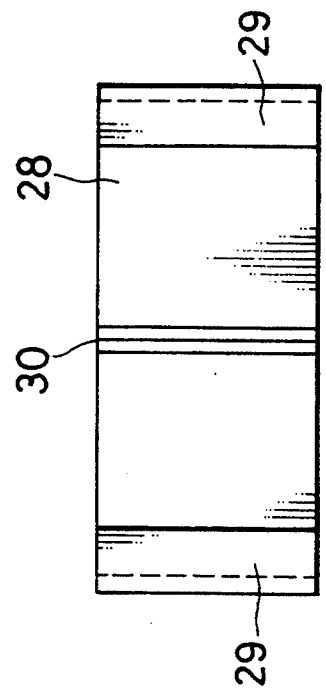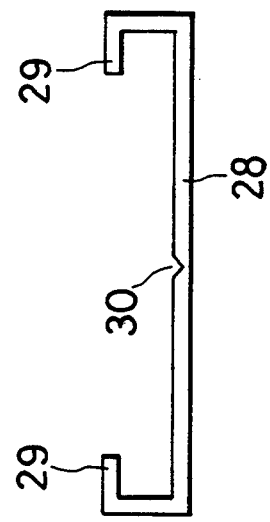

SOUND INSULATING DEVICE

BACKGROUND OF THE INVENTION

1. Field of the Invention

The present invention concerns a sound insulating device for reducing propagation of vibrational impact sounds. More in particular, it relates to a sound insulating device suitable to use as a sound insulating floor device for reducing impact sounds generated in upstairs from transmitting to adjacent downstairs of a house.

2. Description of the Prior Art

In recent years, floor impact sounds from upstairs of a house have caused a significant problem, for example, in apartment houses. The floor impact sounds include floor impact sounds caused by light weight impact shocks which are generated upon ordinary walking and floor impact sounds caused by heavy weight impact shocks which are generated upon falling of a heavy weight mass or upon leaping action of a children or the like, and there was no effective countermeasure other than increasing the thickness of floor slabs, particularly, for floor impact sounds caused by heavy weight impact shocks.

However, if the thickness of the floor slabs is increased, the number of stories that can be constructed within a predetermined designed height is decreased and the cost for the construction materials is also increased. Accordingly, this can not always be considered as an effective means. Further, this method is extremely difficult to be applied to a wooden residence.

In view of the above, the present applicant has previously proposed a sound insulating device having a shock absorbing mechanism of a reduced vertical size to be put between an upper material and a lower material which can be applied easily also to existent buildings or timber houses and which is free from a worry of worsening the habitability as shown in Japanese Patent Laid-Open Hei 2-289759.

In this sound insulating device proposed previously by the present applicant, since the vibrational impact sounds are absorbed by an elastic member and the elastic recovery of the elastic member is resisted by a damping mechanism, it has a merit capable of absorbing heavy weight impact sounds without deteriorating the habitability. However, if it is intended to absorb also the light weight impact sounds by this shock absorbing mechanism, it results in a problem of worsening the habitability or reducing the absorbing effect for heavy weight impact sounds.

OBJECT OF THE INVENTION

The present invention has been achieved in view of the foregoing situations and it is an object of the invention to provide a sound insulating device capable of absorbing light weight impact sounds, as well as heavy weight impact sounds.

Another object of the present invention is to provide a sound insulating device capable of further improving the absorbing effect for vibrational impact sounds without deteriorating habitability and capable of extending the working life of a shock absorbing mechanism.

A further object of the present invention is to provide a sound insulating device with no worry of reducing the absorbing effect for impact sounds depending on the skills of constructing operation and capable of facilitating the constructing operation.

A still further object of the present invention is to provide a sound insulating device capable of decreasing a vertical distance between an upper material and a lower material as narrow as possible.

SUMMARY OF THE INVENTION

The foregoing objects of the present invention can be attained by a sound insulating device having a shock absorbing mechanism put between an upper material and a lower material for absorbing vibrational impact sounds, wherein the shock absorbing mechanism comprises a spring mechanism that deforms elastically under the effect of an impact load and a shock absorber disposed between the spring mechanism and the upper material or the lower material, the shock absorber having a weakened portion that deforms elastically preceding to the elastic deformation of the spring mechanism.

In the present invention, when an impact load is exerted, since the weakened portion of the shock absorber deforms elastically prior to the elastic deformation of the spring mechanism, vibrational light weight impact sounds can be absorbed by the elastic deformation of the weakened portion. In addition, since the spring mechanism itself can be constituted as a structure optimal to absorption of vibrational heavy weight impact sounds, there is no such disadvantage as worsening the habitability or reducing the absorbing effect for vibrational heavy impact sounds.

BRIEF DESCRIPTION OF THE ACCOMPANYING DRAWINGS

These and other objects, as well as advantageous features of the present invention will become apparent by reading the following descriptions with reference to the accompanying drawings, wherein FIG. 1 is a cross sectional view illustrating a sound insulating device in a preferred embodiment according to the present invention;

FIG. 6 is an enlarged cross sectional view of the base plate taken along lines VI—VI in FIG. 4;

FIG. 7 is a cross sectional view illustrating an elastic member in details;

FIG. 8 is a bottom view of FIG. 7;

FIG. 9 is a detailed view for a cover mounted to the elastic member;

FIG. 10 is a plan view of FIG. 9;

Figure 20A:
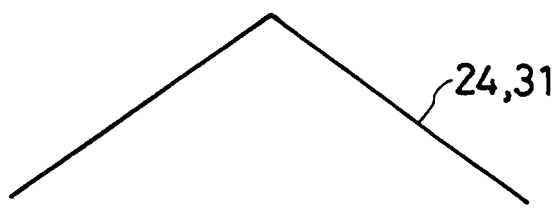
Figure 21:
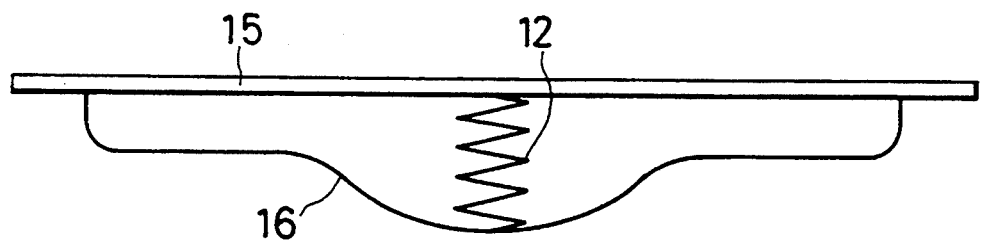
Figure 22:
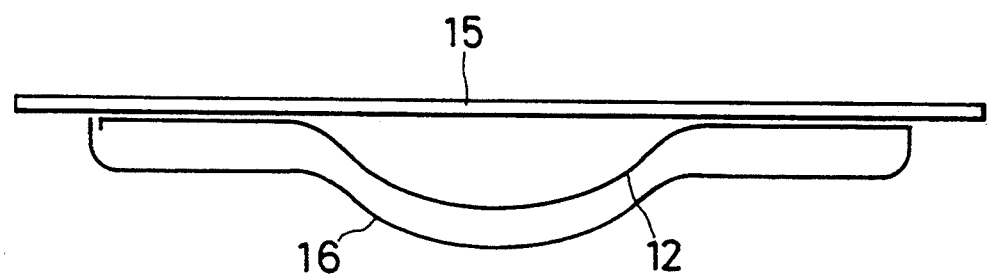
Figure 23:
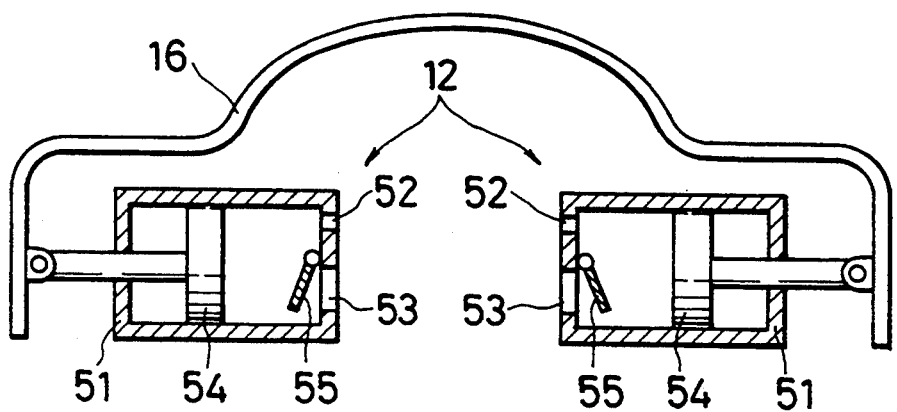
Figure 24A:
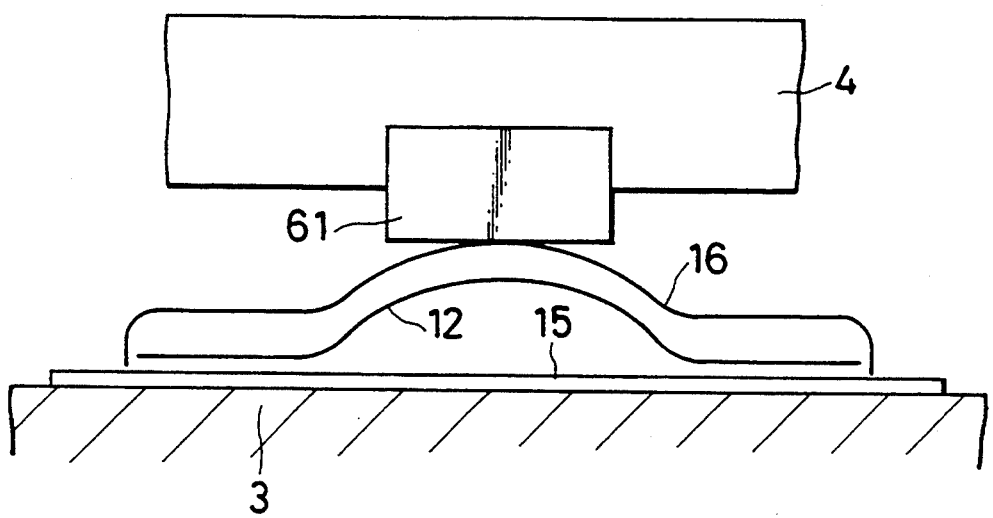
Figure 24B:
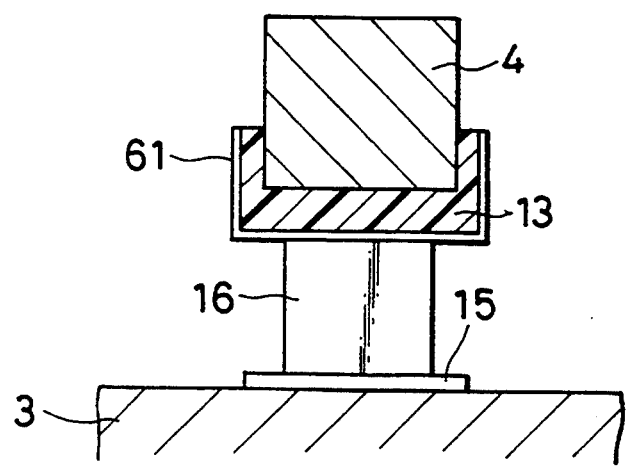
Figure 25:
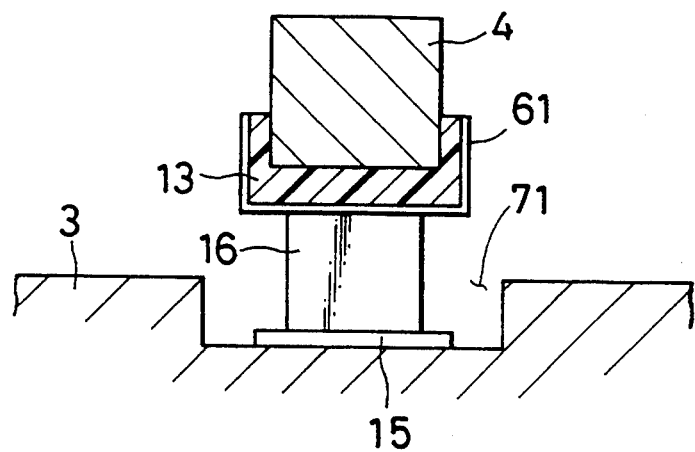
Figure 26:
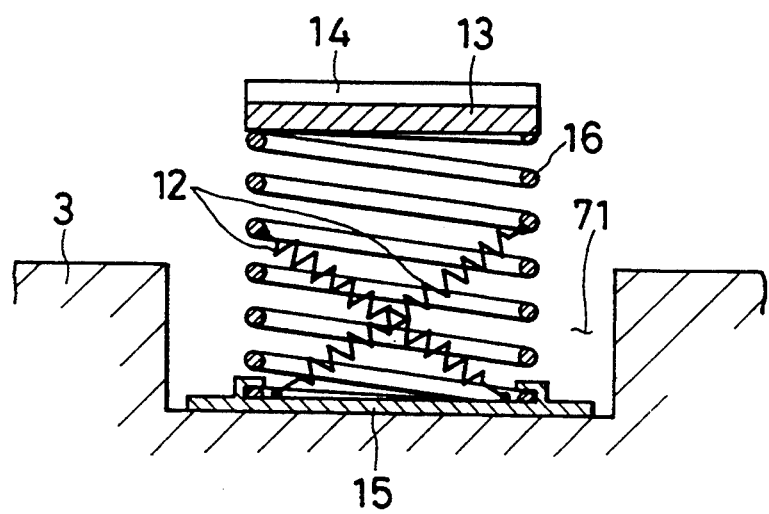
Figure 27:
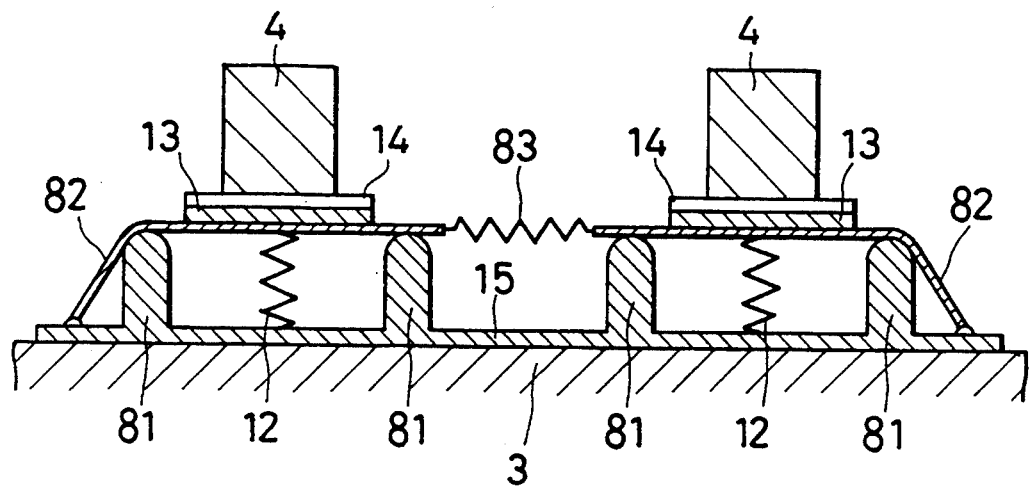
Figure 28A:
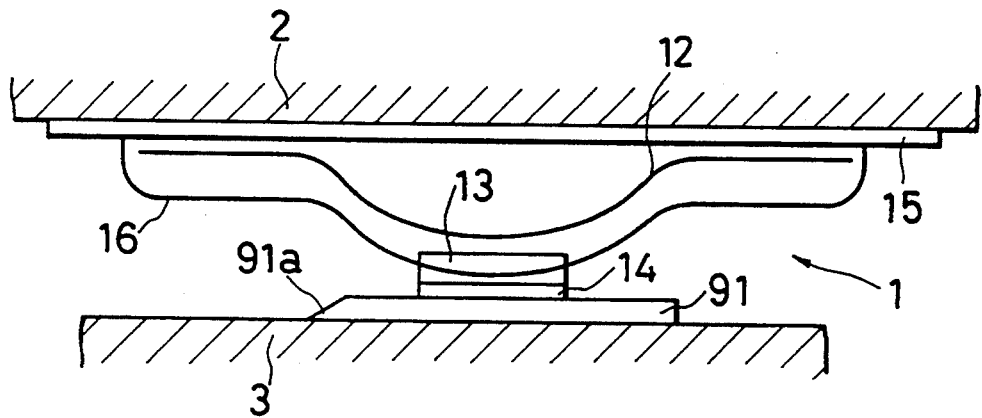
Figure 28B:
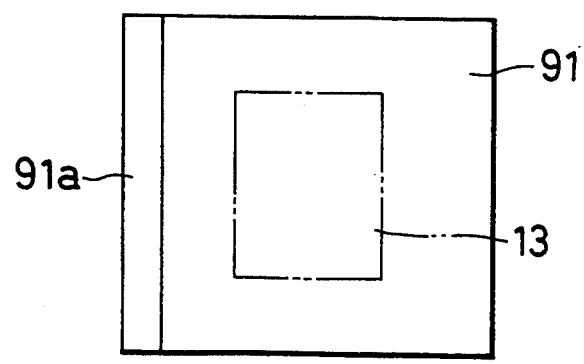

FIGS. 19 (a), (b) are, respectively, explanatory views illustrating a structure in which shock absorbing mechanism is disposed between adjacent Joists;

FIGS. 20(a), (b), (c) are respectively explanatory views, illustrating spring portions of different shapes;

FIG. 21 is an explanatory view of a shock absorbing mechanism comprising a leaf spring and a coil spring;

FIG. 22 is an explanatory view of a shock absorbing mechanism comprising a single sheet of spring material;

FIG. 23 is an explanatory view of an embodiment of a damping mechanism comprising an air spring device;

FIG. 24(a) is a constitutional view of a shock absorbing mechanism using a metal receptacle;

FIG. 24(b) is a side elevational view of FIG. 24a;

FIG. 25 is an explanatory view illustrating an example in which a lower material has a recess;

FIG. 26 is an explanatory view illustrating an embodiment in which a shock absorbing mechanism comprises a coil spring;

FIG. 27 is an explanatory view illustrating a shock absorbing mechanism of a structure in which two steel belts are connected with a coil spring;

FIG. 28(a) is an explanatory view illustrating a method of making a gap by using a spacer plate;

FIG. 28(b) is a plan view of FIG. 28a illustrating a relation b a shock absorber and a spacer plate.

DESCRIPTION OF PREFERRED EMBODIMENTS

Description will now be made to the present invention with reference to the drawings.

Figure 1:
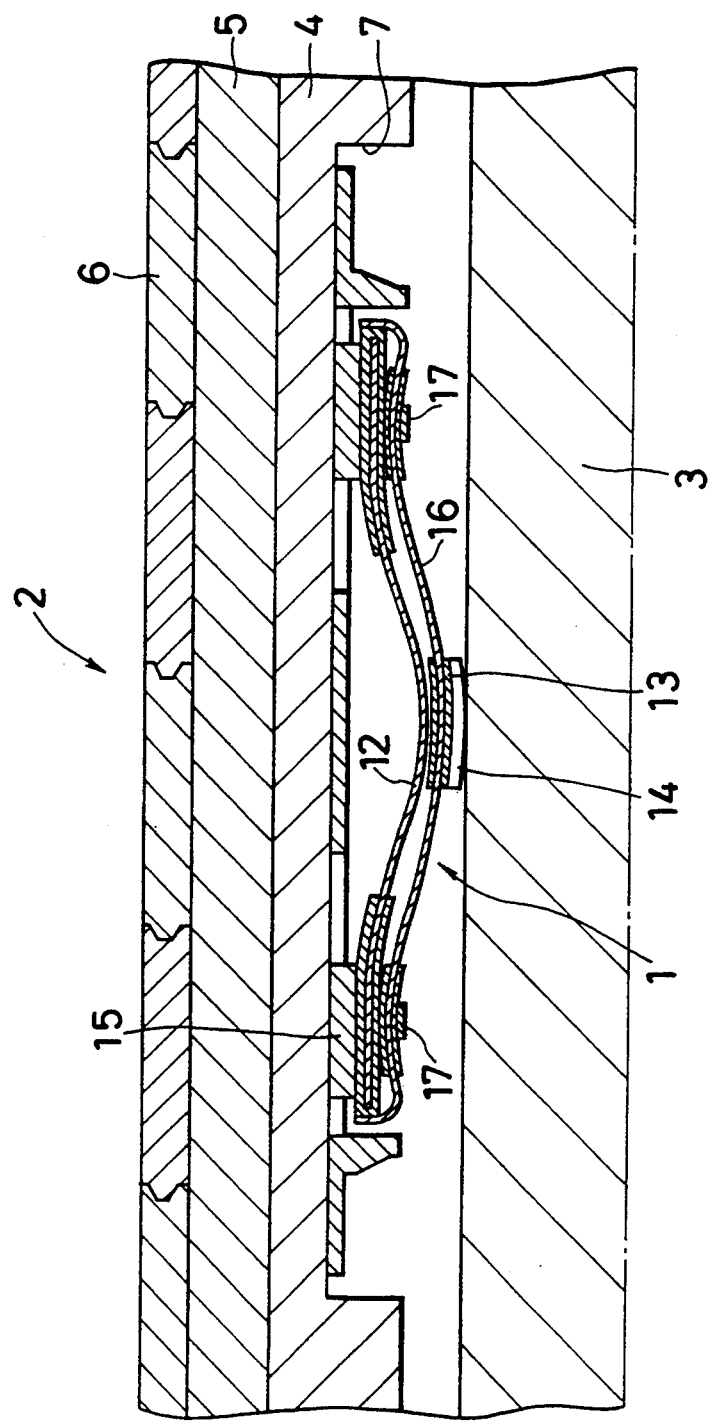

FIG. 1 shows a sound insulating device in a preferred embodiment according to the present invention in which a shock absorbing mechanism 1 is put between an upper material 2 and a lower material 3 for absorbing vibrational impact sounds.

As shown in FIG. 1, the upper material 2 comprises a Joist 4 comprising square timbers disposed each at a predetermined distance, a subfloor board 5 made, for example, of a particle board disposed on the Joist 4 and a finished floor 4 made, for example, of flooring disposed on the subfloor 5. The lower material 3 is made, for example, of concrete floor slabs. The shock absorbing mechanism partially buried in a concave recess 7 disposed in the joist 4, so that a vertical size of the Joist 4 and the lower material 3 can be minimized.

The Joist usually comprises square timbers each having a cross sectional size within a range about from 10×10 mm to 200×200 mm and, preferably, about 35×90 mm, which are disposed each at 600 mm distance. The distance may be optionally varied. In addition to the timber, metal material such as aluminum, iron or stainless steel, plastic material, bonded board, laminated board or plywood can also be used. The shock absorbing mechanism 1 is previously attached in the concave recess 7 of the joist 4 as a unitary structure. The unitary structure can facilitate the field constructing work and keep the shock absorbing function not varied irrespective of the skills of constructing operation.

Depending on the type of the subfloor 5 to be described later, the Joist 4 may be saved in which the shock absorbing mechanism 1 is attached directly to the subfloor 5. Also in this case, the concave recess 7 may be disposed to the subfloor 5.

The subfloor 5 is made of a particle board having a thickness within a rage of about 3 to 60 mm, preferably, about 25 mm which is cut into a size within a range of about 100×150 mm to 1200×2700 mm, preferably, about 900×1200 mm size. In addition to the particle board, veneer, plywood insulation board, hardboard, bonded board, lumber core, honeycomb or laminated board may also be used.

Further, the finished floor 6 is usually made of flooring of 12 to 15 mm thickness, which may be selected from the group consisting of cork, plywood, synthetic resin material, bonded flooring, laminated flooring, veneer, metal plate such as of alumina, glass, ceramic, rubber, mortar, stone, plaster board, insulation board, hardboard, cloth, mat, carpet or a composite material comprising a combination of them. Further, asbestos, glass fiber, rubber, chemical fiber, natural fiber or like other sound insulating material may be put between the finished floor 6 and the subfloor 5 or between the subfloor 5 and the joist 4.

Figure 2:
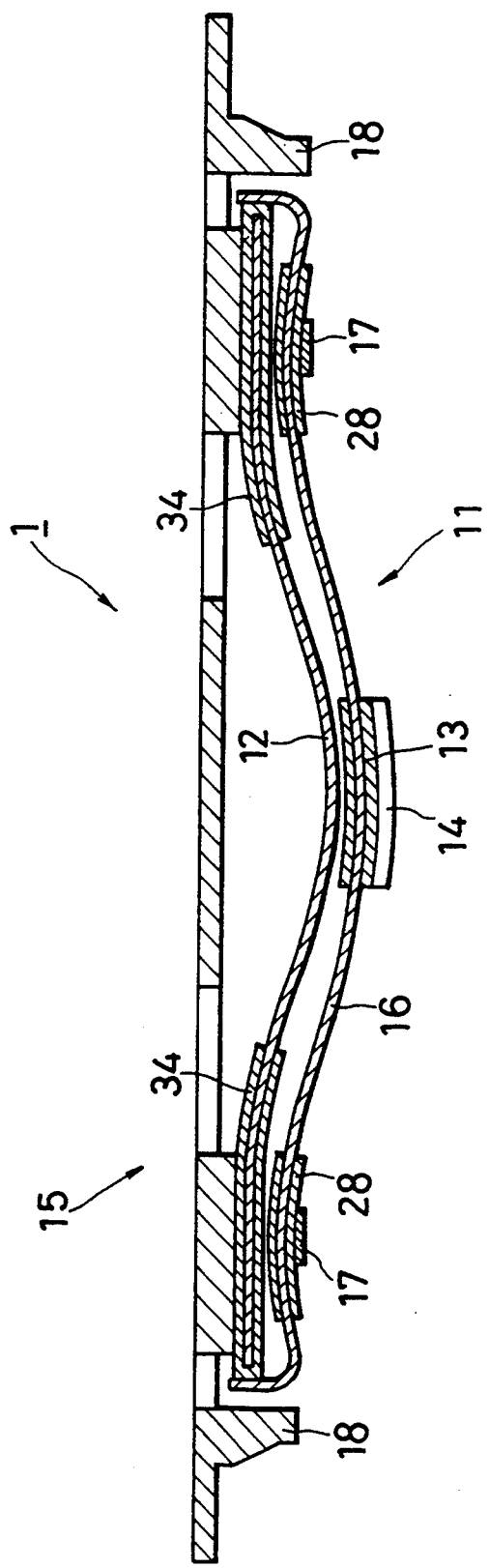
FIG. 2 is an enlarged view for a damping mechanism shown in FIG. 1.

As shown in FIG. 2, the shock absorbing mechanism 1 comprises a spring mechanism 11 that deforms elastically under the effect of impact shocks to absorb vibrational impact sounds, a damping mechanism 12 that gives resistance to the elastic recovery of the spring mechanism 11 and a shock absorber 13 disposed between the spring mechanism 11 and the lower material 3. As detailed later, a portion highly sensitive to minute vibrational sounds, which is simply referred to as a weakened portion 14, and which undergoes elastic deformation prior to elastic deformation of the spring mechanism 11 is disposed to the shock absorber 13, A plurality of shock absorbing mechanisms 1 are usually arranged in a matrix within a range from 100×100 mm to 2000×2000 mm, preferably, 600 mm×900 mm.

Figure 3:
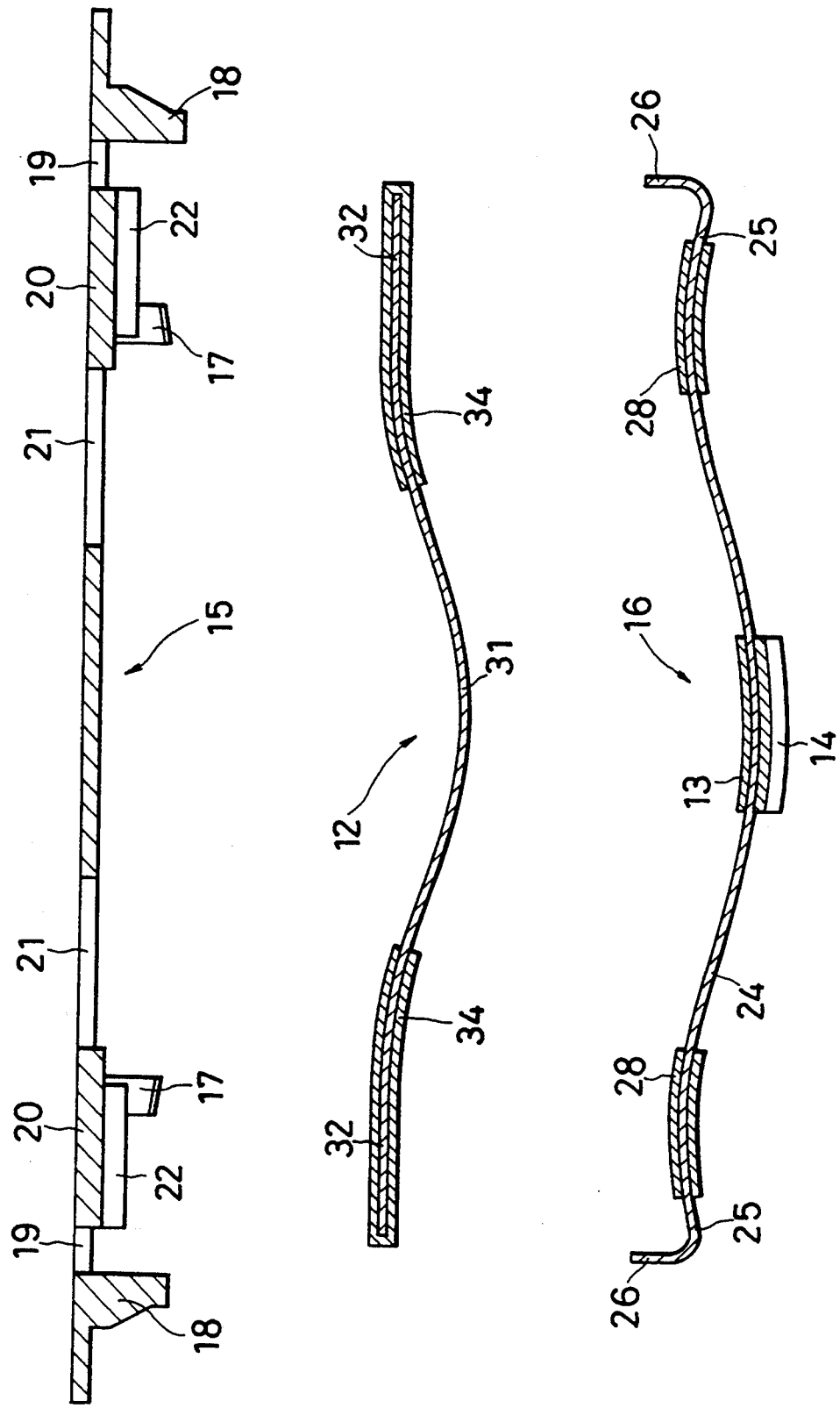
FIG. 3 is an exploded view of FIG. 2.

As shown in FIG. 3, the spring mechanism 11 comprises a base plate 15, an elastic member 16 disposed to the lower surface of the base plate 15 and a supporting mechanism 17 for supporting the elastic member 16 to the base plate 15 such that the elastic member 16 can freely deforms elastically.

Figure 4:
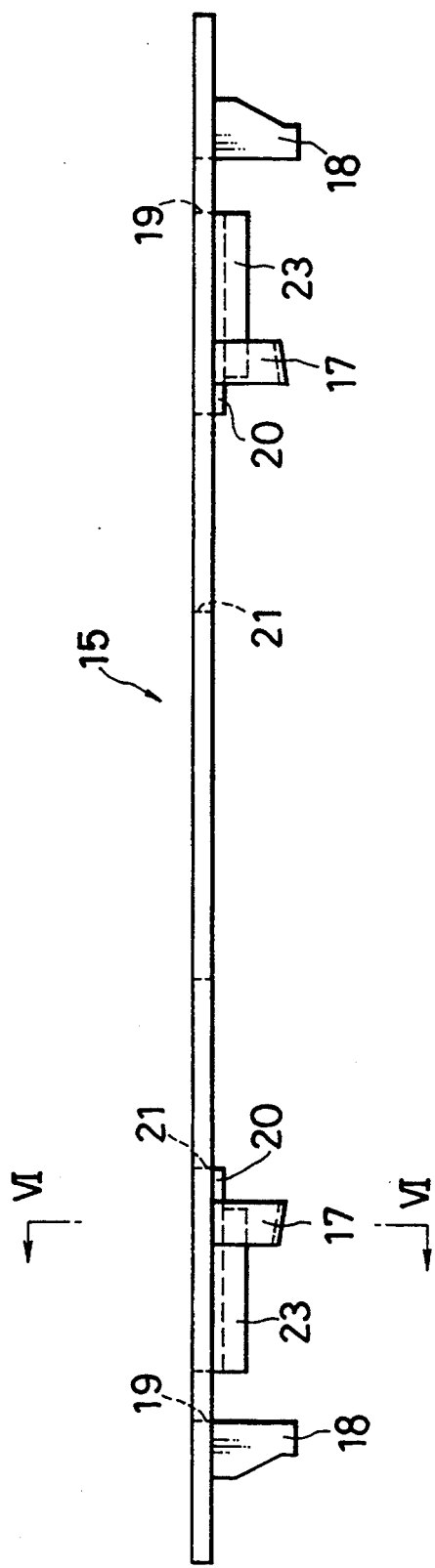
FIG. 4 is a front elevational view of a base plate.
Figure 5:
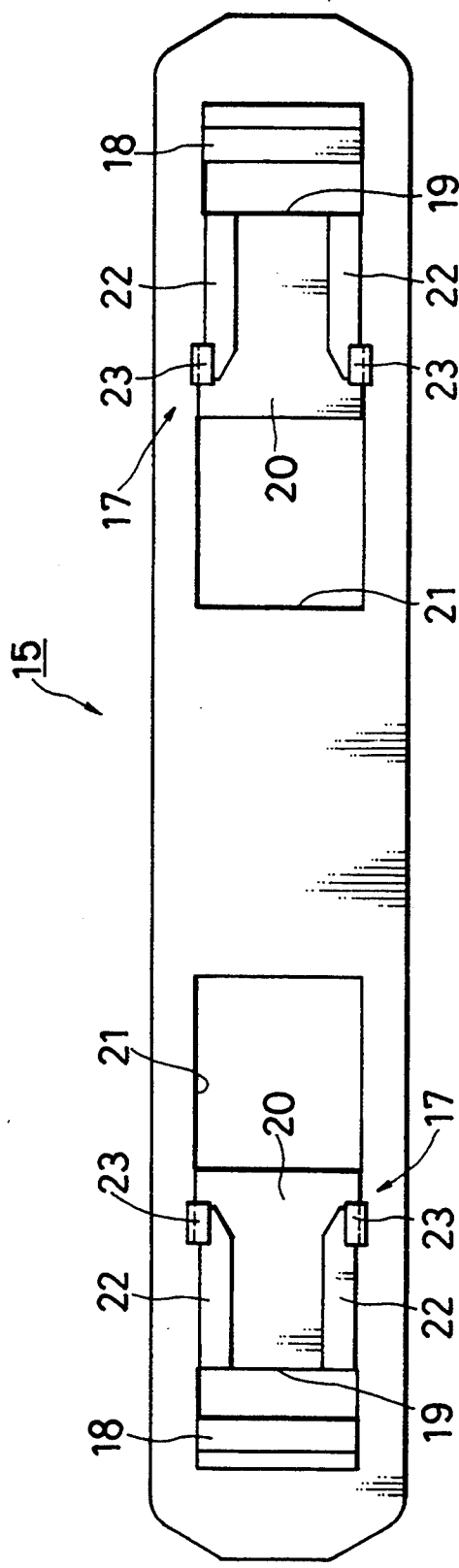
FIG. 5 is a bottom view of the base plate shown in FIG. 4.

As shown in FIG. 3 to FIG. 5, the base plate 15 is made, for example, of a plastic material into a rectangular plate of about 50 mm width and 300 mm length. Protrusions 18, 18 are disposed near both ends of the plate, respectively, for controlling the longitudinal position of the elastic member 16. An elastic member escape hole 19, a support 20 and a damping mechanism escape hole 21 are successively disposed inwardly from each of the protrusions 18.

As shown in FIG. 3 to FIG. 6, the support 20 has a lower surface that protrudes downwardly from the lower surface of the base plate 15, and both longitudinal ends of the damping mechanism 12 to be described later are disposed on the support 20.

As shown in FIG. 5 and FIG. 6, a pair of support guide members 22 suspend downwardly from both lateral ends of the support 20 for supporting both lateral sides of the damping mechanism 12, and both longitudinal ends of the elastic member 16 are placed on the lower surface of the support guide members 22. The supporting mechanism 17 is disposed integral with the base plate 15 at the longitudinal inner end of each of the support guide members 22.

As shown in FIG. 3 to FIG. 6, the supporting mechanism 17 comprises a pair of engagements 23 each having an inwardly hooking top end, such that the elastic member 16 is embraced on both longitudinal ends thereof when the elastic member 16 is mounted while elastically deforming both of the engagements 23 outwardly.

As shown in FIG. 7 and FIG. 8, the elastic member 16 is made, for example, of a strip-like spring material by bending the same and it comprises a spring portion 24 at a longitudinal central portion that is bent into a downwardly convex shape, substantially horizontal supports 25 formed on both sides of the spring 24 and receiving portions 26 disposed outside of each of the supports 25 and bent upward to receive the damping mechanism 12. The surface of the elastic member 16 is covered with an outer coating layer 27 made of a synthetic resin, preferably, polyethylene or formed polyethylene. The thickness of the outer coating layer 27 is about more than 0.2 mm, preferably, about from 0.4 to 0.8 mm, so that a vibrational sound absorbing effect can be obtained in addition to a rust-preventive effect.

Further, as shown in FIG. 7 and FIG. 8, the elastic member 16 has a length $L_1$ of 20 to 1000 mm, preferably, about 240 mm, a width $W_1$ of 5 to 100 mm, preferably, about 30 mm and a height $H_1$ of 5 to 500 mm, preferably, about 25 mm and a plate thickness $T_1$ of 0.5 to 5 mm, preferably, about 2.5 mm. A cover 28 is attached to each of the supports 25 of the elastic member 16 for preventing the same from direct contact with the support guide member 22 and the engagement 23. Further, the shock absorber 13 is attached to a central portion of the spring 24.

As shown in FIG. 9 and FIG. 10, the cover 28 is made, for example, of a plastic material into a lip-shaped groove having lip 29 at an opening end, in which a V-groove 30 is formed to a central portion of a groove bottom for facilitating attachment to the elastic member 16.

Figure 11:
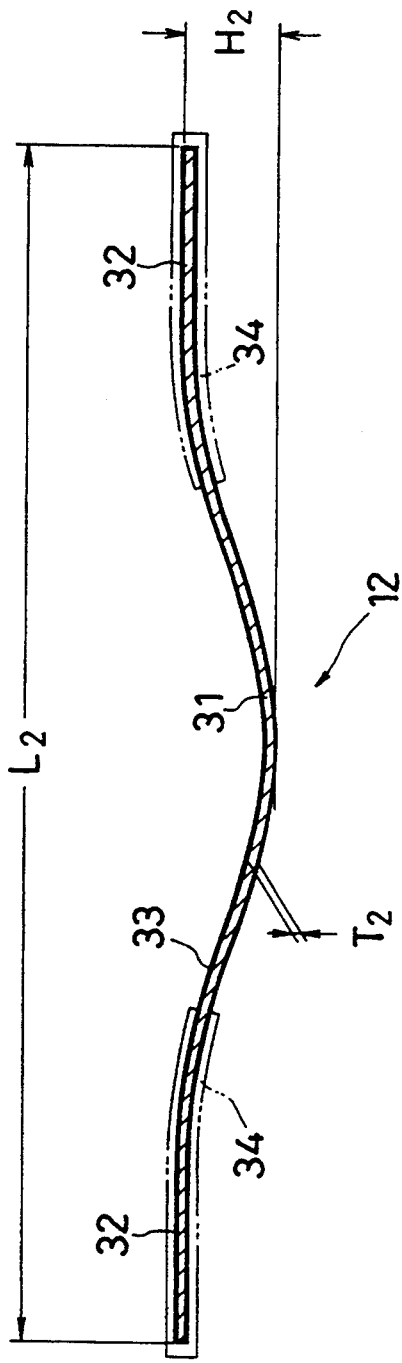
FIG. 11 is a cross sectional view showing details of the damping mechanism.
Figure 12:
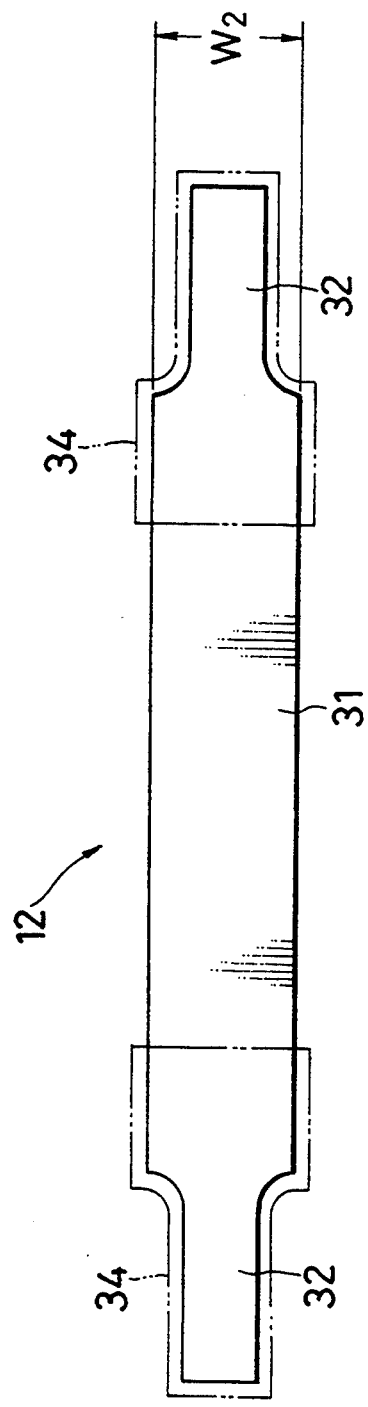
FIG. 12 is a bottom view of FIG. 11.

On the other hand, as shown in FIG. 11 and FIG. 12, the damping mechanism 12 is made of a strip-like spring material by bending to shape the same. The damping mechanism 12 comprises a spring portion 31 formed at a central portion that bends into a downwardly convex shape, and damping portions 32 formed on both sides of the spring portion 31 and extending substantially horizontally. The width of each damping portion 32 is narrowed at the outer end into a substantially one-half width as shown in FIG. 12, which is disposed between the support guide member 22. The surface of the damping mechanism 12 is coated with an outer coating layer 33 made, for example, of a synthetic resin, preferably, polyethylene or foamed polyethylene. The outer coating layer has a thickness of greater than 0.2 mm, preferably, about 0.4 to 0.8 mm for providing a vibrational sound absorbing effect in addition to a rust-preventive effect.

Further, as shown in FIG. 11 and FIG. 12, the damping mechanism has a length $L_2$ of 20 to 1000 mm, preferably, about 240 mm, and adapted such that it can be enforced and attached between the receiving portions 26 of the elastic member 16 by a small force in a state in which a cover 34 described later is attached to the damping portion 32 on both sides. The damping mechanism 12 has a width $W_2$ of 5 to 100 mm, preferably, about 30 mm, a height $H_2$ of 2 to 480 mm, preferably, about 18 mm and a plate thickness $T_2$ of 0.4 to 4 mm, preferably, about 1.6 mm. Then, each of the covers 34 is attached to each of the damping portions 32 of the damping mechanism 12.

Figure 13:
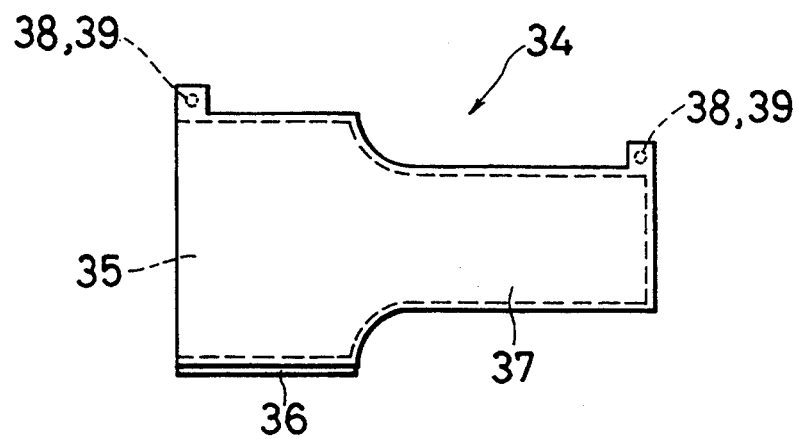
FIG. 13 is a detailed view for a cover mounted to the damping mechanism.
Figure 14:
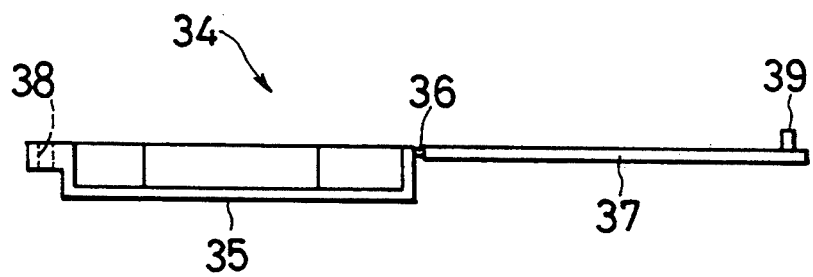
FIG. 14 is a view illustrating the cover in FIG. 13 with a lid being opened.

As shown in FIG. 13 and FIG. 14, the cover 34 comprises a vessel-shaped main body 35 having shallow bottom and a lid 37 connected by way of a hinge 36 to the main body 35. They are made, for example, of a synthetic resin by integral molding. When engaging protrusions 39 of the lid 37 are enforced into engaging holes 38 of the main body 35, the damping portion 32 can be covered. The cover 34 can further reduce vibrational sounds and prevent peeling of the outer coating layer 27.

Figure 15:
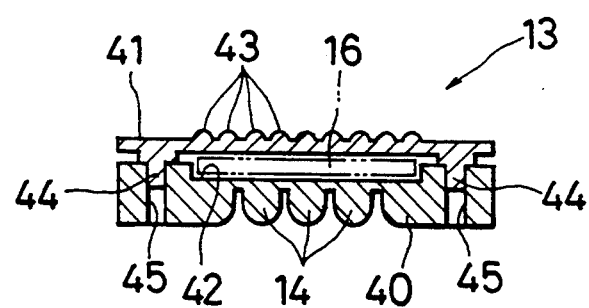
FIG. 15 is a cross sectional view illustrating the constitution of a shock absorber attached to the elastic member.

As shown in FIG. 15, the shock absorber 13 comprises an outer member 40 having the weakened portion 14 formed at the outer surface and an inner member 41 surrounding the elastic member 16 together with the outer member 40.

Figure 16:
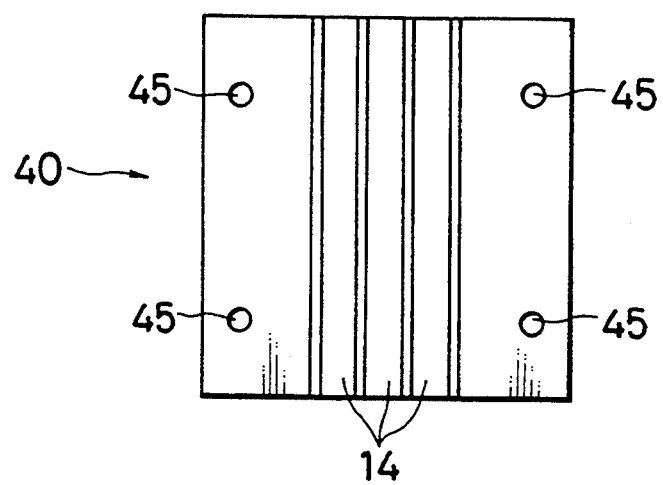
FIG. 16 is a view illustrating an outer member of the shock absorber as viewed from beneath of FIG. 15.

As shown in FIG. 15 and FIG. 16, the outer member 40 is made, for example, of a synthetic resin into a rectangular thick plate having a lateral width greater than the width $W_1$ of the elastic member 16. The upper member 40 has a shallow groove 42 formed at the upper surface to which the elastic member 16 is disposed and the weakened portion 14 comprising, for example, a plurality of protruding ridges formed at the lower surface thereof. The weakened portion 14 undergoes elastic deformation prior to the elastic deformation of the elastic member 16, so that the portion 14 can absorb light weight impact sounds.

Instead of the protruding ridges, the weakened portion 14 may comprise, for example, stud-like protrusions and may be disposed to the upper surface in contact with the elastic member 16 instead of the lower surface of the outer member 40. Further, holes may be bored within a range of the wall thickness of the outer member 40 to serve the bored portion as the weakened portion 14. The weakened portion 14 may also be formed by appending a foamed synthetic resin material having an appropriate hardness to the lower surface of the outer member 40.

Figure 17:
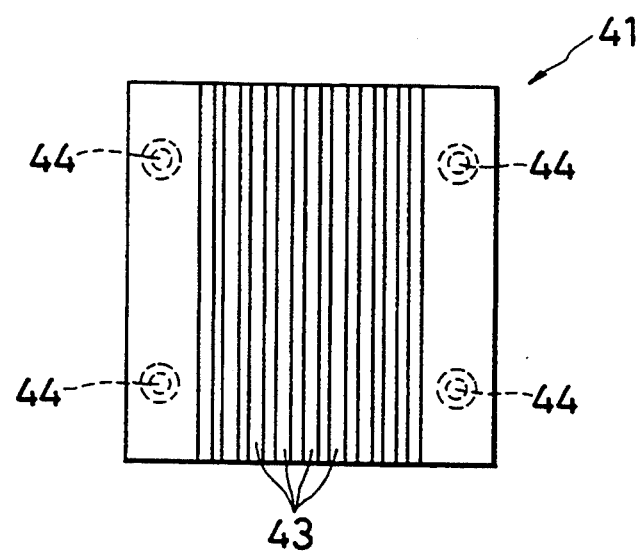
FIG. 17 is a view illustrating the structure of an inner member of as view from above of FIG. 15.

On the other hand, as shown in FIG. 15 and FIG. 17, the inner member 41 is made, for example, of a synthetic resin into a thin rectangular plate of the same shape and the size as those of the outer member 40, and a plurality of small protruding ridges 43 are integrally formed to the upper surface of the inner member 41. The inner member 41 can inhibit direct contact between the elastic member 16 and the damping mechanism 12, so that it can prevent impact sounds, as well as prevent peeling of the outer coating layers 27, As shown in FIG. 15 to FIG. 17, the inner member 41 and the outer member 40 are connected integrally by enforcing the engaging protrusions 44 disposed at four corners of the inner member 41 into engaging holes 45 formed at four corners of the outer member 40, and they are mounted and secured to the elastic member 16.

OPERATION OF THE EMBODIMENT

The operation of this embodiment will be explained.

In FIG. 1, when an impact load exerts on the finished floor 6, the weakened portion 14 of the shock absorber 13 at first deforms elastically. In a case of a light weight impact load, only the weakened portion 14 deforms elastically to absorb vibrational impact sounds.

On the other hand, in a case of a heavy weight impact load, the spring portion 24 of the elastic member 16 deforms elastically succeeding to the elastic deformation of the weakened portion 14 and then the spring portion 31 of the damping mechanism 12 deforms elastically being pressed by the spring portion 24. Then, the impact load is absorbed by the series of elastic deformation to absorb heavy weight impact vibrational sounds.

By the way, upon elastic recovery of the spring portion 24 of the elastically deformed elastic member 16, the receiving portions 26 on both ends inwardly deform elastically, upon which they are urged from the inside by the damping portions 32 of the damping mechanism 12 to undergo resistance to the elastic recovery of the spring portion 24. Therefore, vibrations of the elastic member 16 are damped rapidly to improve the habitability.

Experimental Example

Figure 18:
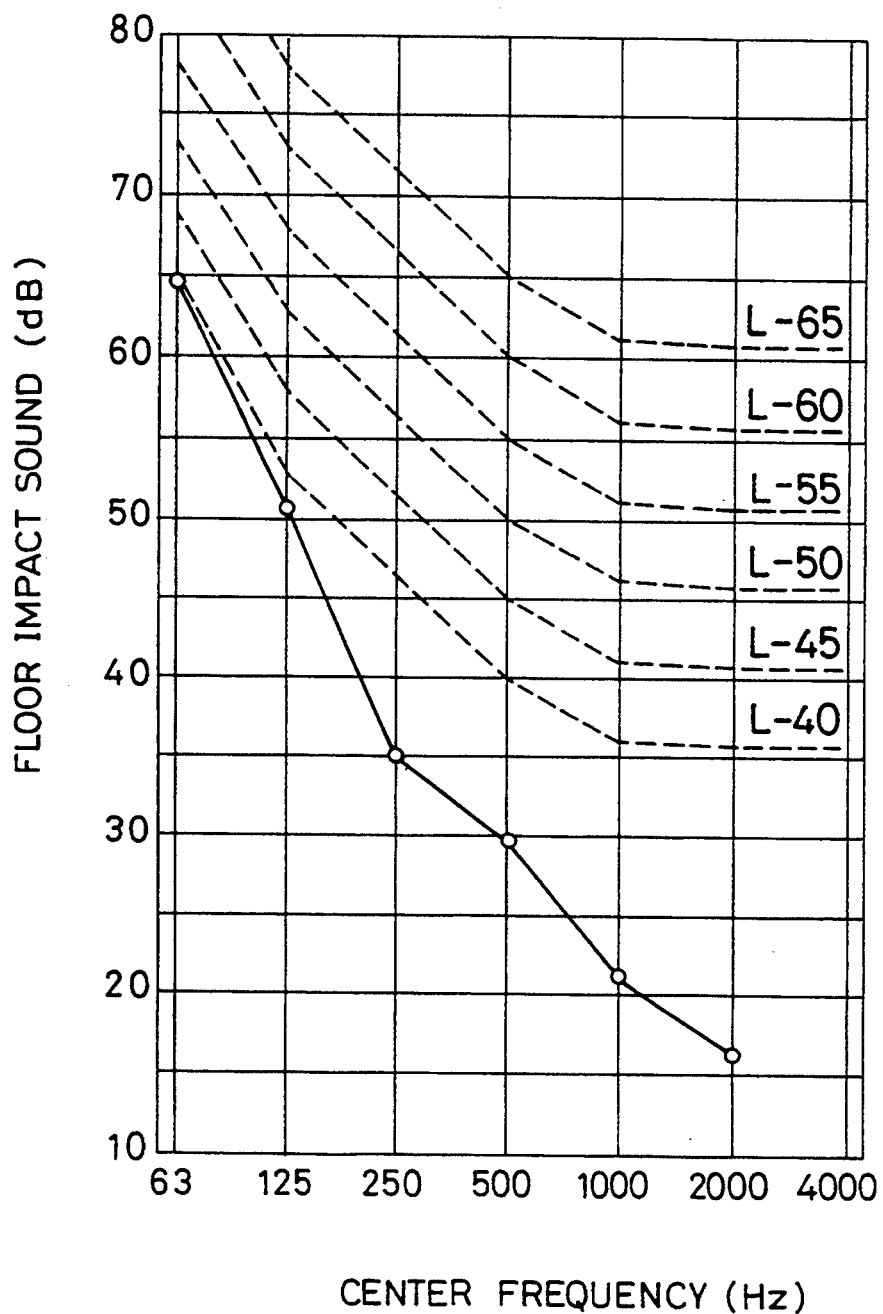
FIG. 18 is a graph illustrating the effect of the shock absorbing mechanism.

The present inventor, et al carried out an experiment by arranging the damping mechanisms 1 as described above each at a pitch of a 600×900 mm matrix on a concrete floor, for confirming the extent of improvement to floor impact sound levels, to obtain a result as shown in FIG. 18.

For the elastic member 16, a metal spring having a length $L_1$ of 240 mm, a width $W_1$ of 30 mm, a height $H_1$ of 25 mm and a plate thickness $T_1$ of 2.5 mm was used and, for the damping mechanism 12, a metal spring having a length $L_2$ of 232 mm, a width $W_2$ of 30 mm, a height $H_2$ of 18 mm and a plate thickness $T_2$ of 1.6 mm was used. Then, the surfaces of them were coated with 0.5 mm thick polyethylene to form outer coating layers 27 and 33.

As apparent from a solid line graph shown in FIG. 18, an excellent result was obtained over a wide frequency region and it was confirmed that a sound insulating level $L_H$ 40 can be satisfied with no troubles.

Then, since the heavy weight impact sounds are absorbed by the elastic member 16 and the damping mechanism 12, as well as the light weight impact sounds are absorbed by the shock absorber 13, an effective absorbing effect for vibrational impact sounds can be obtained over a wide frequency region.

Further, since the damping mechanism 12 and the elastic member 16 are covered with the outer coating layers 27 and 23, respectively, each having a thickness of greater than 0.2 mm, a vibrational sound absorbing effect can be obtained together with a rust-preventive effect. Especially, in a case of making the outer coating layers 27 and 33 of polyethylene, a sufficient intimate contact is attained between the damping mechanism 12 and the elastic member 16, to obtain an effective effect for a long period of time.

Further, since the shock absorber 13 is assembled into the shock absorbing mechanism 1, the outer coating layers 27 and 33 can be protected effectively and, in addition, this improves the efficiency of constructing operation as compared with the case of disposing the absorbent to the lower material 3. Further, since the width of the shock absorber 13 is made greater than the width $W_1$ of the elastic member 16, when the shock absorbing mechanism 1 is previously assembled into the Joist as a unitary structure, there is no worry of worsening the stability turning down the joist 4 during constructing operation.

Descriptions have been made in the previous embodiment to a case of attaching the shock absorbing mechanism 1 directly to the concave recess 7 of the joist 4, but a buffering sheet such as made of rubber or plastic may be used as an intervention, or the concave recess 7 may be saved. In a case of saving the concave recess 7, a large space can be provided between the Joist 4 and the lower material 3 to further improve the sound insulating effect, further stabilize temperature and moisture and the large space can be utilized as a space for installing electric wirings or pipelines.

Figure 19A:
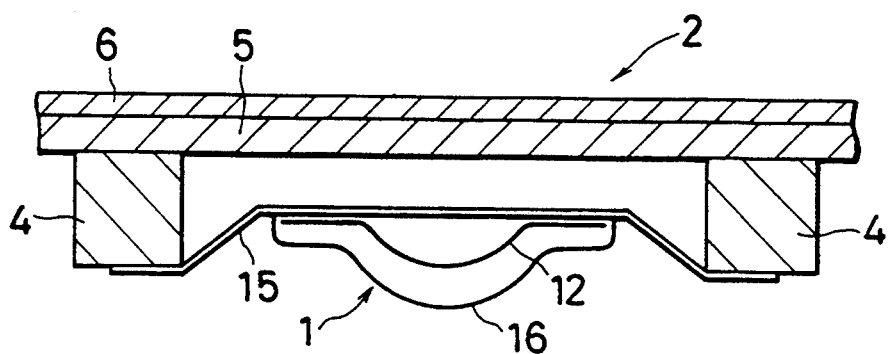
Figure 19B:
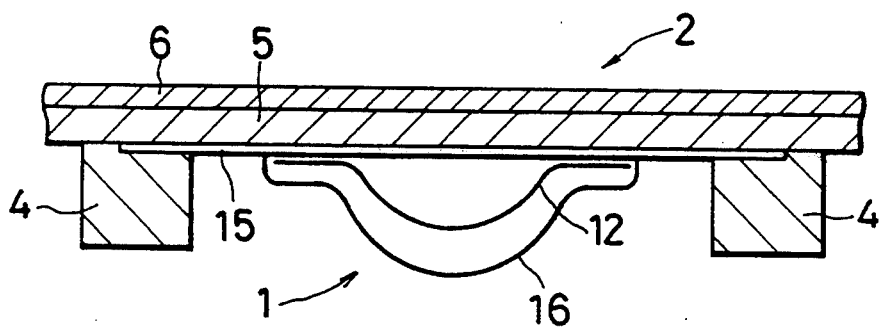

Further, as shown in FIG. 19a and FIG. 19b, the shock absorbing mechanism 1 may be disposed between adjacent joists 4 such that a portion of the absorbing mechanism 1 is within a range of the thickness of the upper material 2.

Figure 20B:
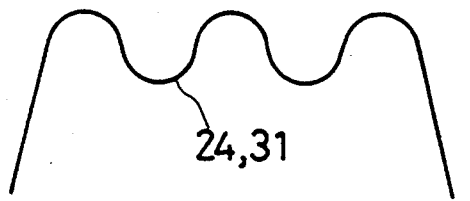
Figure 20C:
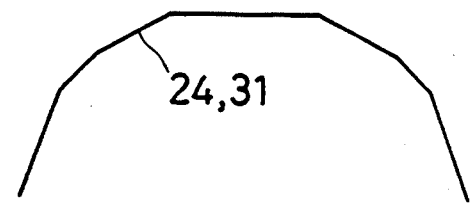

Further, the damping mechanism 12 and the elastic member 16 are not restricted only to the structure shown in the previous embodiments but each of the spring portions 24 and 81 may be of a trigonal, undulatory or polygonal shape as shown in FIGS. 20a, 20b and 20c, as well as it is not necessary that the plate thickness is uniform for each of the portions. Further, instead of using the spring steel, stainless steel, plastic, fiber reinforced plastic, a composite material comprising, for example, rubber put between spring steels or laminated spring may also be used. In addition, the spring may not necessarily be a plate-like shape but a curved rod-shape spring material, bundled linear spring materials or a bent coil spring may also be used. Further, as shown in FIG. 21, springs of different structures may be used, for example, using a leaf spring as the elastic member 16 and a coil spring as the damping mechanism 12.

Further, there is not always necessary to constitute each of the damping mechanism 12 and the elastic member 16 with a single sheet of spring material but each of them may be constituted with a plurality of spring materials so long as they are within a range of about 2 to 10 sheets. Further, as shown in FIG. 22, the damping mechanism 12 and the elastic member 16 may be constituted with a single sheet of spring material.

Further, as shown in FIG. 23, the damping mechanism 12 may be constituted as an air spring device comprising a pair of cylinders 51 each having a small hole 52 and a large hole 53, a piston 54 moving slidably in the cylinder 51 and an opening/closing valve 55 for opening and closing the large hole 53 in accordance with the sliding movement of the piston 54.

Further, although descriptions have been made in the foregoing embodiments to a case of using the shock absorbing mechanism 1 with the elastic member 16 being convex downwardly, the shock absorbing mechanism 1 may also be used while turning upside down. In this case, if the stability of the shock absorbing mechanism 1 is poor, a metal receptacle 61 such as in a grooved shape may be disposed to the top of the elastic member 16 and the shock absorber 13 may be disposed to the inner surface of the metal receptacle 61 as shown in FIG. 24a and FIG. 24b.

Further, in this case, if it is necessary to narrow the vertical distance between the lower material 3 and the joist 4, a concave recess 71 may be formed to the lower material 3 and the shock absorbing mechanism 1 may be disposed within the concave recess 71 as shown in FIG. 25. Then, if the depth of the concave recess 71 can be sufficiently large, both of the elastic member 16 and the damping mechanism 12 can be constituted with coil springs as shown in FIG. 26.

In addition, as a method of narrowing the vertical distance between the Joist and the lower material 3 without disposing a concave recess to the latter, it may be considered, as shown in FIG. 27, that four support members 81 are disposed on a base plate 15, two steel belts 82 are secured at their outer ends to the base plate 15, respectively, and both inner ends of the steel belts 82 are connected to each other by a coil spring 83. This constitution can narrow the vertical distance between the lower material 3 and the Joist 4 also by the use of the coil spring 83.

Although not explained, particularly, in the previous embodiments, if the lower material 3 is concrete floor slabs cast in a building site, unevenness results inevitably to the surface. Then, a shock absorbing mechanism 1 may possibly causes a gap between the weakened portion 14 and the lower material 3, for example, in a case shown in FIG. 1. In such a case, the gap may be eliminated by putting a space filling plate 91 of a rectangular plate shape greater than the shock absorber 13 and having a slope 91a at the top end between the shock absorbing mechanism 1 and the lower material 3 as shown in FIG. 28a and FIG. 28b. In this case, since the gap is not always identical, a plurality kinds of gap filling plates 91 of different thicknesses are provided and they are properly selected and used in accordance with the size of the gap, or a plurality of gap filling plates 91 are stacked for use. In a case if there is a worry that the stacked gap filling plates 91 may be displaced from each other, a protrusion disposed to the upper surface of the lower space filling plate 91 may be fitted to engage the recess disposed to a lower surface of the upper space filling plate 91.

Further, although descriptions have been made in the previous embodiments to a case where the lower material 3 is concrete floor slabs, it may be applied also to a timber house, in which the lower material 3 comprises a ledger board.

Further, although the descriptions have been made in the previous embodiments to a case of applying the invention as a sound insulating floor device, it is applicable not only to sound insulation for the floor but also to sound insulation for a staircase, as well as it is also applicable, for example, to sound insulation of equipments that generate vibrations such as internal combustion engines, to obtain a similar advantageous effect.

As has been described above according to the present invention, since a shock absorber having a weakened portion is disposed in addition to the spring mechanism, not only vibrational heavy weight impact sounds but also vibrational impact light weight sounds can be absorbed reliably without causing a disadvantage of worsening the habitability. Further, if a damping mechanism is disposed, the habitability can be improved further.

Then, in the present invention, the weakened portion embodied as ridges, a surface, bored structure or a foamed synthetic resin can easily provide a condition optimum to absorption of light weight impact sounds.

Further, when the spring mechanism is constituted with a base plate, an elastic member and a supporting mechanism, the spring mechanism is formed as a unitary structure to facilitate constructing operation. Further, since the elastic member operates on the basic plate, stable elastic deforming operation can always be attained even when the material for the upper material and the lower material is changed. Further, by coating the elastic member with a synthetic resin material, vibrational sounds caused upon elastic deformation of the elastic member can be reduced and the working life can be extended.

In this case, if the thickness of the synthetic resin material is made greater than 0.2 mm, vibrational sounds caused upon elastic deformation of the elastic member can be prevented substantially completely and the use of polyethylene or foaming product thereof is most preferred. Further, since polyethylene or the foaming product thereof is excellent in heat resistance and cold resistance, it is stable also against temperature change.

Further, when the shock absorbing mechanism is assembled into a unit material of a predetermined shape to provide a unitary structure and the upper material or the lower material is constituted with the unit material, the constructing operation is facilitated and the disadvantage that the effect of absorbing vibrational impact sounds is reduced depending on the skills of the constructing operation is eliminated completely.

Furthermore, if a portion of the shock absorbing mechanism is situated within a thickness of at least one of the upper material or the lower material, the gap between the upper material and the lower material can be narrowed and the shock absorbing mechanism can be protected against damages caused by overloading.

As many apparently widely different embodiments of the invention may be made without departing from the spirit and scope thereof, it is to be understood that the invention is not limited to the specific embodiments thereof except as defined in the appended claims.

What is claimed is:

1. A sound insulating device having a shock absorbing mechanism disposed between an upper material and a lower material for absorbing vibrational impact sounds caused by an impact load applied from said upper material to said lower material, wherein the shock absorbing mechanism comprises a resilient mechanism affixed to one of said upper material and lower material and adapted to deform elastically when subjected to said impact load thereby absorbing said vibrational impact sounds, and a shock absorber disposed on the resilient mechanism at a position between the resilient mechanism and one of the upper material and the lower material, said shock absorber having an elastically deformable portion which deforms elastically more easily than said resilient mechanism when subjected to said impact load.

2. A sound insulating device as defined in claim 1, wherein a damping means is further disposed at a position between the resilient mechanism and one of the upper material and the lower material for resisting an elastic recovery of the resilient mechanism, said elastic recovery resulting from a removal of said impact load.

3. A sound insulating device as defined in claim 1, wherein the elastically deformable portion comprises a plurality of protrusions and recesses disposed on a surface of the shock absorber on a side subjected to said impact load.

4. A sound insulating device as defined in claim 1, wherein the elastically deformable portion is made of synthetic resin foams.

5. A sound insulating device as defined in claim 1, wherein the resilient mechanism comprises a base plate, an elastic member disposed on one side of the base plate and bent convexly in a direction away from the base plate and a supporting mechanism for supporting the elastic member to the base plate such that the elastic member can freely deforms elastically, and the elastic member is covered with a synthetic layer of resin material.

6. A sound insulating device as defined in claim 5, wherein the synthetic resin material covering the elastic member has a thickness of greater than 0.2 mm.

7. A sound insulating device as defined in claim 5, wherein the synthetic resin material covering the elastic member is made of one of polyethylene and a foamed product thereof.

8. A sound insulating device as defined in claim 1, wherein the shock absorbing mechanism is attached to a preformed unit material of a predetermined shape to form a unitary structure, said unitary structure being adapted to be preformed for delivery to and installation at a construction site, and wherein the unit material constitutes one of the upper material and the lower material.

9. A sound insulating device as defined in claim 1, wherein a portion of the shock absorbing mechanism is mounted within a recess formed in one of the upper material and the lower material, said shock absorbing mechanism projecting out of said recess and extending in a direction toward the other of said upper material and lower material.

* * * * *